United States Patent
Betremieux et al.

(10) Patent No.: US 10,035,923 B2
(45) Date of Patent: Jul. 31, 2018

(54) AQUEOUS DISPERSION OF POLYMER MADE FROM MULTISTRUCTURED PARTICLES FOR AQUEOUS COATINGS HAVING IMPROVED BLOCKING AND FINGERPRINT RESISTANCE AND HARDNESS

(71) Applicant: Arkema France, Colombes (FR)

(72) Inventors: Isabelle Betremieux, Coye la Foret (FR); Alain Boone, Verderonne (FR); Jean-Yves Loze, Saint-Victor-de-Chretienville (FR)

(73) Assignee: Arkema France, Colombes (FR)

( * ) Notice: Subject to any disclaimer, the term of this patent is extended or adjusted under 35 U.S.C. 154(b) by 232 days.

(21) Appl. No.: 15/035,852

(22) PCT Filed: Nov. 12, 2014

(86) PCT No.: PCT/FR2014/052878
§ 371 (c)(1),
(2) Date: May 11, 2016

(87) PCT Pub. No.: WO2015/071590
PCT Pub. Date: May 21, 2015

(65) Prior Publication Data
US 2016/0289489 A1    Oct. 6, 2016

(30) Foreign Application Priority Data
Nov. 15, 2013  (FR) .................................. 13 61206

(51) Int. Cl.
*C09D 5/16*     (2006.01)
*C09D 151/00*   (2006.01)
*C08F 285/00*   (2006.01)
*C08L 51/00*    (2006.01)

(52) U.S. Cl.
CPC ........ *C09D 151/003* (2013.01); *C08F 285/00* (2013.01); *C08L 51/003* (2013.01)

(58) Field of Classification Search
CPC .... C09D 5/1662; C09D 5/022; C09D 133/08; C09D 133/12; C09D 151/003; C08F 285/00; C08L 51/003
See application file for complete search history.

(56) References Cited

U.S. PATENT DOCUMENTS

| | | | |
|---|---|---|---|
| 5,298,559 A | 3/1994 | Fujii et al. | |
| 2002/0013405 A1 | 1/2002 | Sakaguchi et al. | |
| 2003/0008945 A1* | 1/2003 | Yeu ...................... | C08F 285/00 523/201 |
| 2008/0058473 A1 | 3/2008 | Freidzon et al. | |
| 2011/0218291 A1 | 9/2011 | Schultes et al. | |
| 2012/0121903 A1* | 5/2012 | Betremieux .............. | C08F 2/24 428/375 |

FOREIGN PATENT DOCUMENTS

| | | |
|---|---|---|
| JP | 2011168770 A | 9/2011 |
| WO | WO 2011/009560 A1 | 1/2011 |

* cited by examiner

*Primary Examiner* — Jeremy R Pierce
(74) *Attorney, Agent, or Firm* — Lynn B. Morreale

(57) ABSTRACT

The invention relates to a crosslinkable or non-crosslinkable aqueous dispersion of polymer, based on structured polymer particles, said particle comprising a core polymer phase, based on a polymer P1 with Tg1 ranging from 60 to 120° C., a second polymer phase enveloping said core, based on a polymer P2 with a Tg2 ranging from −60 to 40° C. and a third outer polymer phase (or shell) based on a polymer P3, with a Tg3 greater than Tg2 not exceeding 120° C. and having a measured Mn of from 1000 to 150 000, with the weight contents of said polymers P1, P2 and P3 being relative to the total weight of polymer (P1+P2+P3): P1 from 5% to 60%, P2 from 40% to 85%, P3 from 5% to 25% with the sum of said weight contents being 100%.

19 Claims, No Drawings

AQUEOUS DISPERSION OF POLYMER MADE FROM MULTISTRUCTURED PARTICLES FOR AQUEOUS COATINGS HAVING IMPROVED BLOCKING AND FINGERPRINT RESISTANCE AND HARDNESS

CROSS-REFERENCE TO RELATED APPLICATIONS

This application is a national stage application under 35 U.S.C. § 371 of PCT/FR2014/052878, filed Nov. 12, 2014, which claims benefit to FR patent application FR13.61206, filed Nov. 15, 2013.

The present invention relates to aqueous dispersions of polymer with multi-structured particles of specific structure and composition.

The dispersions of the invention allow perfect formation of the film during coalescence with a homogeneous film and with high cohesion due to the controlled structure of the particles formed and to their perfect reproducibility and predictability of the MFT as a result. This excellent control consequently allows excellent mechanical performance and other performance, in particular in terms of chemical resistance and mechanical strength, in particular hardness, adhesion, wet abrasion, blocking resistance and imprint resistance. The term "imprint resistance" means here, and throughout, the capacity of the coating not to show any marks or tackiness when a strong pressure is exerted on the coating film.

BACKGROUND OF THE INVENTION

Patent application WO 2011/009 560 describes stable aqueous dispersions containing core/shell two-phase structured particles with a hard core P1 with a Tg1 from 60 to 120° C. and a soft shell P2 with a Tg2 from −20 to 40° C. and an MFT from 0 to 50° C. with P1 representing from 15% to 60% out of P1+P2, for applications in aqueous coatings, which are in particular self-crosslinkable. Despite the very good capacity for film formation and the control of this process with good reproducibility of the film formation and the performance qualities, these dispersions have insufficient performance qualities for certain applications, in particular in terms of hardness, blocking resistance and imprint resistance with better cohesion and mechanical strength of the film obtained. More particularly, the hardness, the blocking resistance and the imprint resistance of coatings of this type are insufficient (too soft despite the reinforcement of the hard core) for certain applications requiring such performance qualities, in particular in industrial applications in which coated heavy objects (doors, windows, furniture, plate metals) are rapidly stacked after applying the coating or decorative applications which require good heat resistance (kitchens, bathrooms) or good imprint resistance (high-resistance wall paints, resistant to scratching and to abrasion).

In point of fact, WO 2011/009 560 describes the structuring of a hard-core soft-shell latex particle according to a specific process. Such a structure leads to a polymer film (coating) which behaves in the same way as would a soft rubber phase reinforced with a dispersion ideally made from hard organic particles which act as reinforcing nanofillers and which are synthesized in situ in a first step. The film thus obtained is flexible (continuous soft phase) and the mechanical reinforcement by the regular inclusions of hard organic nanofillers (core) is reflected by a tensile stress that increases with the elongation, representative of a gradual reinforcement. The soft phase is the continuous phase and, as a result, the quality of the film formation is very good with a homogeneous film. The mechanical properties of the film, obtained by virtue of the perfect film formation, are stable over time with good durability. The process described makes it possible to obtain a predictable, reproducible MFT that is stable over time. However, depending on the industrial application conditions, the required levels of hardness and of blocking resistance and imprint resistance are difficult to achieve with a soft-shell particle which ultimately constitutes the continuous phase of the film.

Other solutions are also described with polymer dispersions containing structured polymer particles, with a soft core and a hard shell, making it possible to obtain high hardness and blocking resistance. However, owing to its particle structure, this type of polymer dispersion leads to a film that is relatively sparingly cohesive since the continuous phase which is hard and crosslinked rapidly yields when it is stressed. Finally, the presence of a hard shell around the particle, when a high level of gloss is desired, requires the use of coalescers despite the low MFT of the emulsion.

SUMMARY OF THE INVENTION

To overcome the drawbacks of the prior art, it is proposed according to the present invention to modify a structured dispersion of the prior art as described according to WO 2011/009 560, already involving a hard core phase P1 and a soft shell phase P2, this modification consisting in particular in adding a second shell phase P3, in addition to the soft shell P2, with P3 being a phase that is hard or harder than P2, optionally oligomeric, and optionally functionalized, this modification making it possible readily to achieve the targeted properties without losing those that are associated with the structure according to WO 2011/009 560 insofar as the physicochemical characteristics of the second shell P3 are such that they do not prevent good deformation of the first shell P2 and thus good film formation. This particle thus modified is then referred to herein for the present invention as a "multi-structured" particle in particular having the three phases P1. P2 and P3 as defined and thus being "three-layered". The very wide variety of possible choices for this novel three-phase structure, in terms of Tg (calculated according to Fox), of weight percentage of the phases, of molecular mass and of functionalization, and the specific process and its ease of implementation make it possible to envisage an adapted and improved response to the specific demands and requirements of the market according to the envisaged applications, this being achieved at lower cost and without any modification of the existing industrial installations, i.e. being easy to implement on existing installations.

In the case of this novel "three-layer" structure hard P1/soft P2/P3 that is hard or harder than P2 according to the invention, the tensile behavior of the final coating is not that of gradual reinforcement, but behavior showing a high Young's modulus (induced by the second hard shell P3) followed by constant reinforcement and not a reduction or drop as in the case of the particles known on the market of soft core/hard shell type and with a higher mechanical stress for a given elongation relative to a P1/P2 dispersion according to WO 2011/009 560. This makes it possible to achieve high levels of hardness and to further increase the mechanical reinforcement of the films, while at the same time maintaining excellent flexibility. This means that the coating films obtained according to the present invention have a higher cohesion energy with flexibility that is maintained relative to the cited dispersions of the prior art.

The present invention thus seeks to develop a stable dispersion, of controlled and reproducible MFT, for the formulation of glossy coatings which have good hardness, blocking resistance and imprint resistance, while at the same time conserving good flexibility, with very good control and reproducibility of the film formation. As a result, the present invention allows the production of a coating film that has reinforced mechanical properties with a hardness/flexibility/cohesion compromise that is difficult if not impossible to obtain with the structures of the prior art, under standard conditions of radical polymerization at atmospheric pressure. As a result, the coating film has a hardness, a blocking resistance and an imprint resistance that are superior to those of the solutions currently known in the prior art, for an emulsion of controlled MFT.

DETAILED DESCRIPTION OF THE INVENTION

A first subject of the present invention relates to an aqueous dispersion of polymer with multi-structured polymer particles in particular having three specific polymer phases (layers), P1, P2 and P3 constituting a "three-layer" particle.

The second subject of the invention relates to a specific process for preparing said dispersion with specific steps.

Next, the invention covers a composition of aqueous dispersion of polymer which comprises at least one aqueous dispersion of polymer according to the invention.

A coating composition which comprises at least one aqueous dispersion of polymer or at least one composition of aqueous dispersion of polymer as defined according to the invention also forms part of the invention.

The invention also covers the use of a dispersion as defined according to the invention as organic binder for aqueous coatings and, finally, a coating which results from the use of said dispersion or of said dispersion composition.

Thus, the first subject of the invention relates to an aqueous dispersion of polymer based on multi-structured polymer particles (at least three different polymer phases) with said particle comprising:
- a polymer phase as core, based on a polymer P1 derived from the emulsion polymerization of a monomer composition M1, with P1 having a glass transition temperature Tg1 (calculated according to Fox) ranging from 60 to 120° C. and preferably from 60 to 100° C.,
- a second polymer phase enveloping said core, based on a polymer P2 derived from the emulsion polymerization of a monomer composition M2, with P2 having a glass transition temperature Tg2 (calculated according to Fox) ranging from −60 to 40° C. and preferably from −30 to 30° C.,
- a third outer polymer phase (or shell) enveloping said phase P2, based on a polymer P3 derived from the emulsion polymerization of a monomer composition M3, with P3 having a glass transition temperature Tg3 (calculated according to Fox) higher than Tg2, in particular more than 5° C. higher (than Tg2) and not exceeding 120° C., preferably from 60 to 120° C. and more preferentially from 60 to 115° C., and a number-average molecular mass Mn measured by size exclusion chromatography or GPC in THF, with polystyrene calibration, not exceeding 150 000, preferably ranging from 1000 to 150 000, with the weight contents relative to the total weight of polymer P1+P2+P3 being for:
  P1 from 5% to 60%, preferably from 5% to 50%
  P2 from 40% to 85%, preferably from 45% to 80%
  P3 from 5% to 25%, preferably from 10% to 20%
and the sum of said weight contents (P1+P2+P3) being equal to 100%.

Preferably, the polymers of phases P1 and P2 have Mn values much higher than 150 000, more particularly close to or greater than 1 000 000.

More particularly, P3 is less hydrophobic than P2 and even more particularly P2 is more hydrophobic than P1.

In general, a "hydrophobic" monomer is a monomer that has little affinity for water or that is sparingly soluble in water. One method for estimating this hydrophobicity is that of measuring the partition coefficient of the substance to be evaluated, between octanol and water, with the hydrophobicity expressed as a logarithm of this partition coefficient. The hydrophobicity value log Kow for a monomer is an estimation calculated from the logarithm of the partition coefficient (log P) between octanol and water, via the method of contribution of the atoms and the structural fragments of the molecule, using for this estimation the KowWin software from SRC (Syracure Research Corporation). This methodology was described by W. M. Meylan and P. H. Howard in 1995 in *Atom/fragment contribution method for estimating octanol-water partition coefficients* in Pharm. Sci. 84:83-92. The partition coefficient P corresponds to the ratio of the chemical concentration in the octanol phase relative to the chemical concentration in the aqueous phase in a system with two phases in equilibrium. As regards a copolymer, in particular such as a polymer defined according to the invention, the overall hydrophobicity value according to the invention based on the logarithm of the octanol/water partition coefficient is defined as being the mean weight value relative to all of the component monomers of said polymer and it is in particular estimated by the mean weight relative to all of the component monomers, from the individual log Kow values calculated via the KowWin method, as described above, and thus corresponds, according to this definition, to:

overall hydrophobicity value: $\Sigma_i[x_i^*(\log K_{ow})_i]$
with
$\Sigma_i$: sum of i component monomers
$x_i$: weight fraction of the monomer i in said copolymer,
$(\log K_{ow})_i$: hydrophobicity value calculated by the KowWin method for said monomer i, with Kow corresponding to the calculated octanol/water partition coefficient and Log Kow being the logarithm of this coefficient.

Preferably, the difference in mean calculated hydrophobicity value according to this principle must be at least 0.2 and in particular at least 0.5 units between P3 and P2, with P2 having a mean calculated log Kow value higher (more hydrophobic) than P3.

The dispersion of the invention is in particular obtained by emulsion polymerization of said composition M1, performed in the presence of three anionic surfactants, at least two of which are different, more particularly with the presence of an anionic surfactant in a seed monomer composition M0 and of two (different) surfactants in the monomer composition M'1 with the overall composition derived from M0 and M'1 corresponding to said monomer composition M1 and said emulsion polymerization of said composition M2 is performed in the presence of at least two surfactants, one of which is a nonionic surfactant, preferably chosen from alkoxylated fatty alcohols, and the other being anionic and possibly being identical or different relative to one of the two surfactants defined above for M1, more particularly identical to or different from that of the seed composition M0.

As anionic surfactants that are suitable for use in M0, M'1 and M2, mention may be made of surfactants bearing a sulfate, sulfonate, phosphate, phosphonate or phosphinate group, in particular among the following:
- $C_8$-$C_{18}$ alkyl sulfosuccinates, which are optionally alkoxylated (diesters of sulfosuccinic acid with $C_8$-$C_{18}$ alcohols, which are optionally alkoxylated)
- $C_8$-$C_{18}$, preferably $C_9$-$C_{14}$ alkyl sulfate, sulfonate, phosphate, phosphonate, phosphinate, which are optionally alkoxylated
- $C_8$ to $C_{18}$ alkylaryl sulfate, sulfonate, phosphate, phosphonate or phosphinate (alkyl substituted aryl), which is optionally alkoxylated.

When said alkyls are alkoxylated, the alkoxy unit may be ethoxy and/or propoxy, ethoxy being the most preferred alkoxy unit. The number of alkoxy units may range from 2 to 30 and preferably from 2 to 10.

More particularly, said anionic surfactant is selected from dodecylbenzene sulfonate, sodium lauryl sulfate, ethoxylated sodium lauryl sulfate, ethoxylated sodium isotridecyl sulfate, ethoxylated ammonium lauryl phosphate or sulfosuccinates and more preferentially from sulfosuccinates.

Preferably, at least one of said anionic surfactants in M1 and M2 is a sulfosuccinate.

According to a particularly preferred option of the dispersion of the invention, said composition M2 and consequently said polymer P2 derived from M2 comprises at least one water-soluble transfer agent. Even more particularly, said composition M3 and consequently said polymer P3 derived from M3 comprises at least two transfer agents including a water-soluble transfer agent and a liposoluble transfer agent, i.e. an agent that is soluble in organic phase in fact in the monomers. Even more preferentially in such a case, the weight ratio of (pure) water-soluble transfer agent to (pure) liposoluble transfer agent for all the phases P2 and P3 (P2+P3) is less than 2 and preferably less than 0.5. Preferably, these transfer agents are mercaptans.

As suitable water-soluble transfer agents, mention may be made of transfer agents comprising an ionic or ionizable group with a small number of carbon atoms, for example not more than 4 carbon atoms. As examples of ionic or ionizable groups, mention may be made of —$CO_2H$ or —$SO_3H$ groups.

As suitable liposoluble transfer agents, mention may be made of transfer agents comprising a larger number of carbon atoms, for example at least 6 carbon atoms.

According to a particular option of the present invention, said composition M3 from which P3 is derived and optionally said composition M2 from which P2 is derived comprise at least one ethylenically unsaturated monomer bearing, in addition to its ethylenic unsaturation, at least one functional group X selected from: acetoacetoxy, diacetone, methylol or alkoxysilane, carboxy/anhydride, hydroxy, amine, epoxy (or oxirane), phosphate, phosphonate, phosphinate, sulfate, sulfonate, amide, imide, aziridine, oxazoline, imidazole, cyclic carbonate, benzophenone, ureido, provided that, in the case of the presence of more than one monomer bearing a functional group X, said groups X cannot react together during the preparation of said dispersion or during storage. In point of fact, this limitation regarding the functionality X, when there is more than one such functionalized monomer X, is imposed to avoid any premature crosslinking of the aqueous dispersion before its final application or use.

Depending on the group X, said monomer bearing a group X may be chosen as follows per group X:
- for carboxy/anhydride: (meth)acrylic acid, itaconic acid/ anhydride, fumaric acid, maleic anhydride, tetrahydrophthalic (THP) acid/anhydride
- for hydroxy: hydroxyalkyl (meth)acrylates, with $C_2$ to $C_4$ alkyl, which are optionally alkoxylated, in particular alkoxylated or non-alkoxylated hydroxyethyl (meth)acrylate (HE(M)A), hydroxypropyl (meth)acrylate (HP(M)A), hydroxybutyl (meth)acrylate HB(M)A
- for epoxy: GLY(M)A glycidyl (meth)acrylate, (meth)acrylate bearing an epoxidized cycloaliphatic group from among epoxidized dicyclopentenyl, epoxidized cyclohexenyl, epoxidized tetrahydrophthalic and epoxidized norbornenyl for amine: aminoalkyl (meth)acrylates or aminoalkyl (meth)acrylamides with $C_2$ to $C_4$ alkyl, for example DMAEMA (dimethyl aminoethyl methacrylate) or TBAEMA (t-butylaminoethyl methacrylate)
- for amide: (meth)acrylamide
- for imide: maleimide
- for cyclic carbonate: glyceryl (meth)acrylate carbonate
- for phosphate: optionally alkoxylated phosphate mono- and/or diesters of hydroxyalkyl (meth)acrylates, the alkoxyl preferably being ethoxyl and/or propoxyl
- for phosphonate: optionally alkoxylated phosphonate esters of hydroxyalkyl (meth)acrylates, the alkoxyl preferably being ethoxyl and/or propoxyl
- for phosphinate: esters of hydroxyalkyl (meth)acrylates with phosphinic acid, the alkoxyl preferably being ethoxyl and/or propoxyl
- for sulfate: hydroxyalkyl (meth)acrylate esters, optionally with alkoxylated alkyl, the alkoxyl preferably being ethoxyl and/or propoxyl
- for sulfonate: optionally alkoxylated (alkyl) sulfonate esters of hydroxyalkyl (meth)acrylates or of hydroxyalkyl(meth)acrylamides, the alkoxyl preferably being ethoxyl and/or propoxyl, sulfonates such as hydroxyethyl (meth)acrylate sulfonate or acrylamide propane sulfonate (including acid or salt form)
- for imidazole: 2-ethyl-(2-oxoimidazolidin-1-yl) methacrylate
- for oxazoline: hydroxyalkyl 2-oxazoline (meth)acrylates
- for ureido: N-(2-methacryloyloxyethyl)ethyleneurea
- for benzophenone: benzophenone (meth)acrylate
- for aziridine: 1-(2-hydroxyethyl)aziridine methacrylate
- for acetoacetoxy: acetoacetoxyethyl (meth)acrylate (AAEM)
- for diacetone: diacetoneacrylamide (DAAM)
- for methylol: N-methylolacrylamide (NMA)
- for alkoxysilane: alkoxysilane (meth)acrylates.

According to a more particularly preferred option, said group X is a reactive group chosen from: acetoacetoxy, diacetone, N-methylol, alkoxysilane, with the preferred monomers bearing said group X being chosen from acetoacetoxyethyl (meth)acrylate (AAEM), diacetonediacrylamide (DAAM), N-methylolacrylamide and alkoxysilane (meth)acrylates. Alkoxysilanes are in fact silanes blocked with alkoxy groups. The advantage of such groups X and of the associated monomers bearing such a group is in the production of aqueous dispersions that are self-crosslinkable on drying, i.e. during the formation of the film and the removal of water, and which are thus of interest for self-crosslinkable aqueous coatings.

According to another particular option, said group X is chosen from: carboxy/anhydride, hydroxy, amine, epoxy (or oxirane), imide, aziridine, oxazoline, imidazole, cyclic carbonate. The advantage of these groups and monomers bearing them is the production of dispersion compositions and more particularly of coating compositions that are crosslinkable by addition to the final application composition of a crosslinking agent bearing at least two groups that are reactive with said groups X of said polymer.

When a monomer bearing a group X is present, the index of groups X expressed in mmol/g (per g) of polymer (the polymer being here: P1+P2+P3) may range from 0.002 to 0.5, preferably from 0.005 to 0.5, more preferentially from 0.01 to 0.5 and even more preferentially from 0.02 to 0.5.

According to a preferred possibility, said polymers P1, P2 and P3 are derived, respectively, from said monomer compositions M1, M2 and M3, constituted exclusively of (meth)acrylic monomers or of mixtures of (meth)acrylic monomers with at least one vinyl aromatic monomer, styrene being the preferred vinyl aromatic monomer.

According to another particular possibility, said polymer P1 is derived from a monomer composition M1 comprising at least one monomer as internal crosslinking agent. This means that said crosslinking agent bears at least two ethylenic unsaturations that are polymerizable during the emulsion polymerization of said composition M1 to give a crosslinked polymer P1. As examples of suitable crosslinking agents, mention may be made of multifunctional monomers with a functionality of acrylic (including methacrylic) and/or allylic or vinyl groups of at least 2. As suitable examples of acrylic crosslinking agents, mention may be made of ethylene glycol di(meth)acrylate, propylene glycol di(meth)acrylate, butanediol di(meth)acrylate, hexanediol di(meth)acrylate, trimethylolpropane tri(meth)acrylate, etc. The term "acrylics" means herein both acrylics and methacrylics, and the term "acrylates" means both acrylates and methacrylates. As acrylic and allylic crosslinking agent, mention may be made of allyl methacrylate. As vinyl crosslinking agent, mention may be made of a monomer bearing at least two vinyl unsaturations, for instance di- and trivinyl benzenes.

The second subject of the invention relates to a process for preparing a dispersion as defined above according to one of the variants of the invention, which process comprises the following emulsion polymerization steps:

i) a seeding step comprising emulsion prepolymerization of a seed monomer composition M0, with the seed particles having a size of less than or equal to 40 nm and representing a weight content ranging from 2% to 25% and preferably from 5% to 20% of the weight of said polymer phase P1, ii) a step of emulsion polymerization of a monomer composition M1 giving a polymer P'1 thus constituting with the seed polymer P0 obtained in step i) said polymer phase P1 of said particle core, said monomer composition M'1 being identical to or different from said seed composition M0 (if identical to M0, it corresponds to that of said monomers M1) and their overall weight-average composition (M0+M'1) corresponding to that of said monomers M1, the product of this step ii) (dispersion) optionally being able to be stored and used at a later time, as starting material for the following step iii), i.e. for the addition and polymerization of said monomer composition M2, iii) a step of emulsion polymerization of a monomer composition M2 giving rise to said polymer phase P2, said step iii) comprising at the start a seeding and optionally in the presence of a water-soluble transfer agent, iv) a step of emulsion polymerization of a monomer composition M3 giving rise to said polymer phase P3, optionally in the presence of two transfer agents, one water-soluble and the other liposoluble, preferably chosen from mercaptans, so as to obtain said polymer P3 as an outer layer.

The overall weight-average composition of the mixture M0+M'1 corresponds to the composition of said monomers M1 from which said polymer phase P1 is derived.

Optionally, the product of this step ii) (dispersion) may be stored and used at a later time, as starting material for the following step iii), i.e. for the addition and polymerization of said monomer composition M2.

According to a first variant of said process:

the seeding step i) is performed in the presence of from 0.01% to 0.5% and preferably from 0.05% to 0.2% by weight of an anionic surfactant (the surfactant product being considered in dry form, i.e. at 100% of surfactant) relative to the total weight of P1+P2+P3 the step of emulsion polymerization ii) of the monomer composition M'1 is performed in the presence of from 0.1% to 3% and preferably from 0.1% to 1.5% by weight, relative to the total weight of P1+P2+P3, of a first anionic surfactant which is identical to or different from that of the seed M0, i.e. the one used in the seeding step i), but, if it is identical, this means that it is added to said step ii), and of a second anionic surfactant different from the first of this step ii), with the weight content of these two anionic surfactants of phase P1 being from 0.1% to 3% and preferably from 0.1% to 1.5% relative to the total weight of P1+P2+P3 the step of emulsion polymerization iii) of the monomer composition M2 is performed in the presence of from 0.1% to 3% and preferably from 0.2% to 2.5% by weight, relative to the total weight of P1+P2+P3, of at least two surfactants a) and b) with a) being a first nonionic surfactant chosen from alkoxylated fatty alcohols, more preferentially alkoxylated $C_{12}$ to $C_{16}$ fatty alcohols, even more preferentially with ethoxy and/or propoxy units as alkoxy units, in particular ethoxy units and more particularly with the number of said alkoxy units being from 3 to 50 and even more particularly from 5 to 40 ethoxy units and b) being an anionic surfactant which may be identical to or different from those of step ii), with said step iii) comprising at the start a seeding and optionally in the presence of at least one water-soluble transfer agent, the step of polymerization iv) of said composition M3 is performed in the presence or absence of surfactants and if (performed) in the presence of surfactants, in this case under the same conditions as those of step iii) and optionally in the presence of at least two transfer agents, of which one is water-soluble and one is liposoluble. More particularly, regarding said process according to the invention:

steps i) and ii) are performed at a temperature of from 75 to 90° C.

the step of polymerization iii) of said monomer composition M2, like the step of polymerization iv) of said monomer composition M3, is performed at a temperature below Tg1, when said process is performed at atmospheric pressure.

More preferentially, regarding said process, step ii) of emulsion polymerization of the overall monomer composition M1, giving said polymer P1, and step iii) of emulsion polymerization of said composition M2 giving said polymer P2 are continued to a degree of conversion of at least 95%, preferentially at least 98% and more preferentially 100% before the addition of said monomer composition M3.

The third subject of the invention relates to an aqueous polymer dispersion composition, which composition comprises at least one aqueous dispersion as defined according to any of the variants defined above according to the invention or obtained via the process as defined according to the invention.

According to a particular and preferred case in said dispersion composition, said dispersion is a dispersion as defined above comprising in P3 and optionally in P2 functionalized monomers X in which said group)(is an acetoacetoxy or diacetone, said composition comprising in dispersion at least one additive bearing at least two groups that are reactive by latent reaction (during the drying film formation of the polymer particles) with said groups X, preferably said latent-reaction additive being a dihydrazide, in particular adipic acid dihydrazide in the case where X is a diacetone and when X is an acetoacetoxy, said additive preferably being a polyamine, in particular diamine or an acrylate ester that is multifunctional in acrylate groups (MFA). The advantage of such a composition is the production of compositions and more particularly of aqueous coating compositions that are self-crosslinkable during drying and film formation with the removal of water.

According to a particularly preferred variant, said aqueous polymer dispersion composition comprises, in addition to said dispersion according to the invention, at least one other aqueous polymer dispersion, preferably with said other dispersion being a dispersion of resins or of polymers chosen from: dispersion of saturated and/or unsaturated polyesters, preferably based on unsaturated polyesters and more preferentially a dispersion of modified or unmodified alkyd resins, dispersion (emulsion) of acrylic copolymers, including purely acrylic and styrene-acrylic copolymers, dispersion of vinyl copolymers, dispersion of acryl acrylic oligomers, dispersion of polyurethanes including unsaturated polyurethanes, in particular acryl polyurethanes, dispersion of hydrocarbon resins or dispersion of colophony resins, including colophony esters or colophony-modified resins.

Among the alkyd dispersions are included dispersions of modified alkyds, in particular modified with acrylic monomers or with vinyl aromatic monomers such as styrene or with urethane units or with amide units or modified with colophony and in particular short in oil. More particularly, said alkyd is biosourced relative to the starting materials used. Such a biosourced resin is described in particular in WO 2012/042 153.

Said dispersion composition may be prepared by mixing said dispersions performed at the temperature of preparation of the dispersion according to the invention or at a lower temperature.

According to another option, said polymer dispersion composition comprises a dispersion according to the invention as defined above with P3 and optionally P2 derived from respective monomer compositions, comprising for P3 and optionally comprising for P2 monomers functionalized with X from among carboxy/anhydride, hydroxy, amine, epoxy (or oxirane), imide, aziridine, oxazoline, imidazole, cyclic carbonate and (said dispersion composition) also comprising at least one crosslinking agent bearing at least two groups that are reactive with said groups X. Such a composition is of particular interest for crosslinkable compositions and in particular crosslinkable coating compositions.

Another subject of the invention relates to a coating composition, in particular an aqueous coating composition, which composition comprises at least one aqueous dispersion as defined according to the invention as described above or obtained via a process as defined according to the invention or said coating composition comprises at least one dispersion composition as defined above according to the invention.

In particular, said coating composition according to the invention is self-crosslinkable and thus comprises said dispersion or said dispersion composition as described above for self-crosslinkable coating compositions.

According to another variant, said coating composition, in addition to said dispersion, with (or having) the polymer P3 and optionally polymer P2 derived from monomer compositions comprising functionalized monomers, X from among carboxy/anhydride, hydroxy, amine, epoxy (or oxirane), imide, aziridine, oxazoline, imidazole and cyclic carbonate, comprises at least one crosslinking agent bearing at least two groups that are reactive with said groups X of said polymer of said dispersion or said coating composition comprises at least one dispersion composition comprising said dispersion.

More particularly, said coating composition does not comprise any coalescer. This means that there is no need for such an agent for coalescence and film formation.

Another subject covered by the present invention is the use of an aqueous dispersion according to the invention or obtained via a process according to the invention, as an organic binder for aqueous coatings, i.e. in aqueous coating compositions.

More particularly, this use may concern crosslinkable aqueous coatings, including self-crosslinkable coatings.

Said use preferably concerns industrial coatings, in particular protective coatings and/or decorative coatings, more particularly chosen from: paints, varnishes, lacquers, primers, inks, adhesives and/or topcoats, and coatings for leak-proofing, for treating glass, for treating fibers, in particular textile, or for treating wovens or nonwovens.

According to a particular option, said use concerns protective coatings chosen from coatings for mechanical and/or chemical protection of substrates, in particular from the following substrates: metal, concrete, fiber cement, plaster, wood, cardboard, plastic, composite, glass, fibers (hollow or filled), textile, leather and woven or nonwoven fabrics which may be synthetic or cellulose-based fabrics.

Finally, the invention also covers, as finished product, a coating resulting from the use of at least one dispersion as described above according to the invention or obtained via a process of the invention as described above or from the use of a dispersion composition as described above according to the invention. More particularly, said coating is crosslinked.

The examples outlined below are presented as illustrations of the invention and of its performance qualities and do not in any way limit the invention.

Experimental Section

A) Preparation of the Aqueous Polymer Dispersions and Characteristics

1) Starting Materials Used (See Table 1 Below)

TABLE 1

Starting materials used in the synthesis of the dispersions

| Component Trade name or abbreviated chemical name | Technical function | Chemical nature | Supplier |
|---|---|---|---|
| Aerosol ® A102 | Anionic surfactant | Ethoxylated fatty alcohol sulfosuccinate, sodium salt ($C_{10}$-$C_{12}$) solution at 30% in water | Cytec |

TABLE 1-continued

Starting materials used in the synthesis of the dispersions

| Component Trade name or abbreviated chemical name | Technical function | Chemical nature | Supplier |
|---|---|---|---|
| Disponil ® FES 32 | Anionic surfactant | Fatty alcohol sulfate polyglycol ether, sodium salt solution at 31% in water | Cognis |
| Emulan ®TO 4070 | Nonionic surfactant | Secondary ethoxylated fatty alcohol with 40 ethoxy, 70% | BASF |
| SR 351 | Crosslinking agent | Trimethylolpropane triacrylate | Sartomer |
| BuA | Monomer | Butyl acrylate | Arkema |
| MMA | Monomer | Methyl methacrylate | Arkema |
| Sty | Monomer | Styrene | Arkema |
| AA | Monomer | Acrylic acid | Arkema |
| MA | Monomer | Methacrylic acid | Arkema |
| DAA | Crosslinking agent | Diacetoneacrylamide | DSM |
| AADH | crosslinking agent vs X | Adipic acid dihydrazide | DSM |
| nDDM | Liposoluble transfer agent | N-Dodecyl mercaptan | Acros |
| MAA | Water-soluble transfer agent | Mercaptoacetic acid | Acros |
| $Na_2S_2O_8$ | Peroxide | Sodium persulfate | Aldrich |
| TBHP | Peroxide | 70% tert-butyl hydroperoxide | Aldrich |
| SFS | Reducing agent | Sodium formaldehyde sulfoxylate | Bruggeman |
| Aqueous ammonia | Neutralizer | Ammonium hydroxide | Prolabo |
| Acticide MBS | Biocide | Aqueous solution of methylisothiazoline (MIT) and of benzisothiazolinone (BIT) (2.5% MIT/2.5% BIT) | Thor |

The Tg values of the polymer phases P1, P2 and P3 are calculated according to Fox's law, from the Tg values of the homopolymers indicated below:

| Monomers | Abbreviation | Tg (° C.) |
|---|---|---|
| Acrylic acid | AA | 106 |
| Methacrylic acid | MA | 228 |
| Butyl acrylate | BuA | −54 |
| Styrene | STY | 100 |
| Methyl methacrylate | MMA | 105 |
| Diacetoneacrylamide | DAA | 77 |

In the case of the test described below and which is in the invention, the calculated Tg values, the weight distributions and the expected Mn values of the various phases are indicated in Table 2 below:

TABLE 2

%, Tg and Mn of the phases P1, P2 and P3

| | P1 | P2 | P3 |
|---|---|---|---|
| Fox Tg in ° C. | 80.5 | −26.5 | 81.6 |
| weight % | 15 | 67 | 18 |
| Mn | $\geq 1 \times 10^6$ | $\geq 1 \times 10^6$ | $1 \times 10^3$-$1.5 \times 10^5$ |

2) General Procedure for Preparing the Dispersions

The procedure described below corresponds to that of the preparation of the dispersion of the invention according to the example described below.

2.1) Equipment Used

A 10 L (internal capacity) steel reactor is used, equipped with a jacket, an efficient stirrer (vortex), a three-flow condenser, a control and a regulator of the material temperature. The reactor comprises the number of introduction connections necessary for separate introduction of the various components and also an introduction dedicated to nitrogen, for working under an inert atmosphere. The leaktightness is checked before each preparation. The installation is equipped with a system for controlling the introduction rates of the components. The polymerization is of semi-batch type at atmospheric pressure.

2.2) Preparation of the Initial Charge as Feedstock 17.5 g of Disponil® FES 32 are dissolved in 1912.8 g of demineralized water as feedstock. The temperature of the feedstock is brought to 80° C.

2.3) Preparation of the Seed M0

82 g of MMA and 9.45 g of BuA are mixed 2.4) Preparation of the Monomer Composition M'1

35 g of Aerosol® A102 and 58.33 g of Disponil® FES 32 are dispersed in 284.7 g of demineralized water with good stirring.

The following are then added in turn and with good stirring:
373.70 g of MMA
43.05 g of BuA
6.30 g of TMPTA
10.50 g of MA The pre-emulsion M'1 thus formed is white and stable and is maintained under gentle stirring.

M'1 is used with M0 for the synthesis of the core of particle P1, composed of P0 derived from M0 and of P'1 derived from M'1 (P1=P0+P'1).

2.5) Preparation of the Monomer Composition M2

35 g of Aerosol® A102 and 75 g of Emulan® TO 4070 are dispersed in 590 g of water with good stirring.

The following are then added in turn and with stirring:
492.45 g of styrene
1735.30 g of BuA
A stable white pre-emulsion is obtained.

5% of this pre-emulsion, i.e. 146.4 g, are taken up and used to perform seeding before adding the rest of the monomer composition M2.

The following are then added to the pre-emulsion, still with good stirring:
78.05 g of MA
39.20 g of DAA
5.52 g of MAA This stable white pre-emulsion serves, with the above-mentioned seeding (146.4 g), for the formation of the first shell P2 of the particle.

The monomer composition M2 thus corresponds to the overall composition of the monomers added.

2.6) Preparation of the Monomer Composition M3

The following are added in turn and with stirring:
515.90 g of MMA
66.50 g of BuA
26.60 g of MA
12.60 g of AA
8.40 g of DAA
35 g of nDDM
1.48 g of MAA
A stable transparent solution is obtained.

This monomer solution M3 serves for the synthesis of the second shell P3 of the particle.

2.7) Preparation of the Sodium Persulfate Solution
8.75 g of $Na_2S_2O_8$
175 g of water 2.8) Preparation of the TBHP Solution
10 g of TBHP
43.85 g of water 2.9) Preparation of the SFS Solution
7 g of SFS
80.50 g of water 2.10) Preparation of the Dispersion by Emulsion Polymerization i) Seeding P0

Since the feedstock with the initial charge is stable at 80° C., the mixture of 82 g of MMA and 9.45 g of BuA are introduced for the seeding P0. Once the temperature has stabilized, 100% of the sodium persulfate solution is added. The exothermicity maximum marks the and of this step; the particle size is about 40 nm and the conversion is greater than 70%.

ii) Synthesis of the Core P1

The introduction of the pre-emulsion M'1 lasts 60 minutes at a polymerization temperature of 80° C.

The temperature is then maintained for a further 60 minutes at 80° C. (post-curing). Next, the reaction medium is cooled to 65° C. The conversion is then close to 100%.

iii) Synthesis of the Shell P2

At 65° C., the seeding constituted by 146.4 g of the fraction of pre-emulsion (as described in point 2.5) above) is introduced into the reactor. Mixing is performed for at least 5 minutes.

Still of the separate introductions:
100% of the pre-emulsion after the abovementioned seeding
65.5% of the TBHP solution
65.5% of the SFS solution During the additions, which last 120 minutes, the temperature of the medium is maintained at 65° C. This step is followed by post-curing which lasts 60 minutes at 65° C. The conversion is then close to 100%.

iv) Synthesis of the Shell P3

At 65° C., start of the separate introductions over 45 minutes:
100% of the monomer composition M3
24.5% of the TBHP solution
24.5% of the SFS solution This step is followed by post-curing which lasts 30 minutes at 65° C. The conversion is then close to 100%.

v) Treatment of the Residual Monomers

The TBHP and SFS solutions are added at 60° C. over 30 minutes. This redox treatment is followed by maintenance at 60° C. for 30 minutes before cooling to room temperature.
10% of the TBHP solution
10% of the SFS solution vi) Final Additions After cooling to about 30-35° C., the dispersion obtained is first neutralized with good stirring (vortex) by adding 28% aqueous ammonia solution, about 6 g per kg of dispersion, added over about 30 minutes. The pH is between 8 and 9. Next, 2.75 g of AADH are post-added with good stirring (vortex). After stirring for 60 minutes, a biocidal system is added. The dispersion is then filtered through a 100 μm gauze and characterized.

3) Characterization Methods and Tests Used 3.1) pH

The pH of the aqueous dispersions is measured according to standard ISO 976.

3.2) Dry Extract

The dry extract of the aqueous dispersions is measured according to standard ISO 3251.

3.3) Viscosity

The viscosity of the aqueous dispersions is measured according to standard ISO 2555.

3.4) Particle Size

The particle size is measured by photon correlation spectroscopy (PCS), using an N4+ machine from Beckman Coulter. The sample is diluted (3 to 5 drops of emulsion in 50 ml of water) in a polystyrene tank using deionized water on a 0.22 μm cellulose acetate filter. The particle size is measured at a temperature of 25° C., at a measuring angle of 90° and at a laser wavelength of 633 nm.

3.5) Minimum Film-forming Temperature (MFT)

The MFT of the aqueous dispersions is measured according to standard ISO 2115.

4) Characterization of the Dispersion

The pH is 8.5.
The dry extract is 51%.
The viscosity is 1150 mPa·s.
The final particle size is about 125 nm,
The measured MFT is 6° C.

The invention claimed is:

1. An aqueous dispersion of polymer based on multi-structured polymer particles having at least 3 different polymer phases wherein said particle comprises:
   a polymer phase as core, based on a polymer P1 derived from the emulsion polymerization of a monomer composition M1, with P1 having a glass transition temperature Tg1, calculated according to Fox, from 60 to 120° C.,
   a second polymer phase enveloping said core, based on polymer P2 derived from the emulsion polymerization of a monomer composition M2, with P2 having a glass transition temperature Tg2 calculated according to Fox from −60 to 40° C., a third outer polymer phase which is a shell enveloping said phase P2, based on a polymer P3 derived from the emulsion polymerization of a monomer composition M3, with P3 having a glass transition temperature Tg3, calculated according to Fox, higher than Tg2, more than 5° C. higher and not exceeding 120° C., and a number-average molecular mass Mn not exceeding 150,000, with the weight contents relative to the total weight of polymer P1+P2+P3 being for:
P1 from 5% to 55%,
P2 from 40% to 85%,
P3 from 5% to 25%,
and the sum of said weight contents (P1+P2+P3) being equal to 100%,
wherein said composition M3 from which P3 is derived and optionally said composition M2 from which P2 is derived comprise at least one ethylenically unsaturated monomer bearing, in addition to its ethylenic unsaturation, at least one functional group X selected from the group consisting of: acetoacetoxy, diacetone, methylolsilane, alkoxysilane, carboxy/anhydride, hydroxy, amine, epoxy (or oxirane), phosphate, phosphonate, phosphinate, sulfate, sulfonate, amide, imide, aziridine, oxazoline, imidazole, cyclic carbonate, benzophenone, ureido, provided that, in the case of the presence of more than one monomer bearing a functional group X, said groups X cannot react together during the preparation of said dispersion.

2. The dispersion as claimed in claim 1, wherein said emulsion polymerization of said composition M1 is performed in the presence of three anionic surfactants, at least two of which are different, with the presence of an anionic surfactant in a seed monomer composition M0 and of two surfactants in a monomer composition M'1 with the overall composition derived from M0 and M'1 corresponding to said monomer composition M1 and in that said emulsion polymerization of said composition M2 is performed in the presence of at least two surfactants, one of which is nonionic, chosen from the group consisting of alkoxylated fatty alcohols, and the other being anionic and optionally being identical or different relative to one of the two surfactants defined for M1.

3. The dispersion as claimed in claim 2, wherein at least one of said anionic surfactants in M1 and M2 is a sulfosuccinate.

4. The dispersion as claimed in claim 1 wherein said composition M2 and consequently said polymer P2 derived from M2 comprises at least one water-soluble transfer agent.

5. The dispersion as claimed in claim 1 wherein said composition M3 and consequently said polymer P3 derived from M3 comprises at least two transfer agents, of which one is water-soluble and one is liposoluble.

6. The dispersion as claimed in claim 5, wherein the weight ratio of (pure) water-soluble transfer agent to (pure) liposoluble transfer agent for all the phases P2 and P3 (P2+P3) is less than 2.

7. The dispersion as claimed in claim 1, wherein monomer bearing a group X is chosen as follows per group X:
for carboxy/anhydride: (meth)acrylic acid, itaconic acid/anhydride, fumaric acid, maleic anhydride, tetrahydrophthalic (THP) acid/anhydride
for hydroxy: hydroxyalkyl (meth)acrylates, with $C_2$ to $C_4$ alkyl, which are optionally alkoxylated, alkoxylated or non-alkoxylated hydroxyethyl (meth)acrylate (HE(M) A), hydroxypropyl (meth)acrylate (HP(M)A), hydroxybutyl (meth)acrylate HB(M)A
for epoxy: GLYMA glycidyl (meth)acrylate, (meth)acrylate bearing an epoxidized cycloaliphatic group from among epoxidized dicyclopentenyl, epoxidized cyclohexenyl, epoxidized tetrahydrophthalic and epoxidized norbornenyl
for amine: aminoalkyl (meth)acrylates or aminoalkyl (meth)acrylamides with $C_2$ to $C_4$ alkyl, DMAEMA (dimethyl aminoethyl methacrylate), and TBAEMA (t-butylaminoethyl methacrylate)
for amide: (meth)acrylamide
for imide: maleimide
for cyclic carbonate: glyceryl (meth)acrylate carbonate
for phosphate: optionally alkoxylated phosphate mono- and/or diesters of hydroxyalkyl (meth)acrylates
for phosphonate: optionally alkoxylated phosphonate esters of hydroxyalkyl (meth)acrylates
for phosphinate: optionally alkoxylated esters of hydroxyalkyl (meth)acrylates with phosphinic acid
for sulfate: hydroxyalkyl (meth)acrylate esters, optionally with alkoxylated alkyl
for sulfonate: optionally alkoxylated sulfonate esters of hydroxyalkyl (meth)acrylates or of hydroxyalkyl (meth)acrylamides, sulfonates, hydroxyethyl (meth) acrylate sulfonate, acrylamide propane sulfonate in acid or salt form
for imidazole: 2-ethyl-(2-oxoimidazolidin-1-yl) methacrylate
for ureido: N-(2-methacryloyloxyethyl)ethyleneurea
for oxazoline: hydroxyalkyl 2-oxazoline (meth)acrylates
for benzophenone: benzophenone (meth)acrylate
for aziridine: 1-(2-hydroxyethyl)aziridine methacrylate
for acetoacetoxy: acetoacetoxyethyl (meth)acrylate (AAEM)
for diacetone: diacetoneacrylamide (DAAM)
for methylol: N-methylolacrylamide (NMA)
for alkoxysilane: alkoxysilane (meth)acrylates.

8. The dispersion as claimed in claim 1 wherein said group X is a reactive group chosen from the group consisting of: acetoacetoxy, diacetone, N-methylol, and alkoxysilane, with the monomers bearing said group X being chosen from the group consisting of acetoacetoxyethyl (meth)acrylate (AAEM), diacetonediacrylamide (DAAM), N-methylolacrylamide and alkoxysilane (meth)acrylates.

9. The dispersion as claimed in claim 1 wherein said group X is chosen from the group consisting of: carboxy/anhydride, hydroxy, amine, epoxy (or oxirane), imide, aziridine, oxazoline, imidazole and cyclic carbonate.

10. The dispersion as claimed in claim 1 wherein the index of groups X expressed in mmol/g of polymer (polymer: PI+P2+P3) ranges from 0.002 to 0.5.

11. The dispersion as claimed in claim 1 wherein said polymers P1, P2 and P3 are derived, respectively; from said monomer compositions M1, M2 and M3, consisting of (meth)acrylic monomers or of mixtures of (meth)acrylic monomers with at least one vinyl aromatic monomer.

12. The dispersion as claimed in claim 1 wherein said polymer P1 derived from a monomer composition M1 comprising at least one monomer as internal crosslinking agent.

13. A process for preparing a dispersion according to claim 1 comprising emulsion polymerization steps:
i) a seeding step comprising emulsion prepolymerization of a seed monomer composition M0, with the seed particles having a size of less than or equal to 40 nm and representing a weight content ranging from 2% to 25% of the weight of said polymer phase P1, ii) a step of emulsion polymerization of a monomer composition M'1 giving a polymer P'1 thus constituting with the seed polymer P0 obtained in step i) said polymer phase P1 of said particle core, said monomer composition M'1 being identical to or different from said seed composition M0 (if identical to M0, it corresponds to that of said monomers M1) and their overall weight-average composition (M0+M'1) corresponding to that of said monomers M1, iii) a step of emulsion polymerization of a monomer composition M2 giving rise to said polymer phase P2, said step iii) comprising at the start a seeding and optionally in the presence of a water-soluble transfer agent, iv) a step of emulsion polymerization of a monomer composition M3 giving rise to said polymer phase P3, optionally in the presence of two transfer agents, one water-soluble and the other liposoluble, so as to obtain said polymer P3 as an outer layer.

14. The process as claimed in claim 13, wherein;
the seeding step i) is performed in the presence of from 0.01% to 0.5% by weight of an anionic surfactant relative to the total weight of P1+P2+P3
the step of emulsion polymerization ii) of the monomer composition M'1 is performed in the presence of from 0.1% to 3% by weight, relative to the total weight of P1+P2+P3, of a first anionic surfactant which is identical to or different from that of the seed M0, and of a second anionic surfactant different from the first of this step ii), with the weight content of these two anionic surfactants of phase P1 being from 0.1% to 3% relative to the total weight of P1+P2+P3
the step of emulsion polymerization iii) of the monomer composition M2 is performed in the presence of from 0.1% to 3% by weight, relative to the total weight of P1+P2+P3, of at least two surfactants a) and b) with a) being a first nonionic surfactant chosen from alkoxylated fatty alcohols, and b) being an anionic surfactant which may be identical to or different from those of step ii), with said step iii) comprising at the start a seeding and optionally (for said step iii)) in the presence of at least one water-soluble transfer agent, the step of polymerization iv) of said composition M3 is performed in the presence or absence of surfactants and if in the presence of surfactants, under the same conditions as those of step iii) and optionally in the presence of at least two transfer agents, of which one is water-soluble and one is liposoluble.

15. The process as claimed in claim 13 wherein:
steps i) and ii) are performed at a temperature of from 75 to 90° C.
the step of polymerization iii) of said monomer composition M2, like the step of polymerization iv) of said monomer composition M3, is performed at a temperature below Tg1, when said process is performed at atmospheric pressure.

16. The process as claimed in claim 13 wherein step ii) of emulsion polymerization of the overall composition M1, giving the polymer P1, and step iii) of emulsion polymerization of said composition M2 giving the polymer P2 are continued to a degree of conversion of at least 95%, before addition of said monomer composition M3.

17. A coating composition comprising at least one aqueous dispersion as defined in claim 1.

18. The composition as claimed in claim 17 comprising in addition to said dispersion, at least one crosslinking agent bearing at least two groups that are reactive with said groups X of said polymer of said dispersion.

19. The composition as claimed in claim 17 which does not comprise coalescer.

* * * * *